United States Patent [19]
Chung et al.

[11] Patent Number: 5,708,075
[45] Date of Patent: Jan. 13, 1998

[54] SILICONE RELEASE COATING COMPOSITIONS

[75] Inventors: Kyuha Chung; Robert Alan Ekeland; Randall Gene Schmidt, all of Midland, Mich.

[73] Assignee: Dow Corning Corporation, Midland, Mich.

[21] Appl. No.: 775,037

[22] Filed: Dec. 30, 1996

[51] Int. Cl.$^6$ ............................................. C08K 5/05
[52] U.S. Cl. .................. 524/765; 427/387; 428/447; 524/770; 524/773; 524/792; 524/861; 524/862; 525/478
[58] Field of Search ................... 525/478; 524/861, 524/862, 765, 773, 770, 792; 427/387; 428/447

[56] References Cited

U.S. PATENT DOCUMENTS

| | | | |
|---|---|---|---|
| 2,676,182 | 4/1954 | Daudt et al. | 260/448.2 |
| 2,823,218 | 2/1958 | Speier et al. | 260/448.2 |
| 2,857,356 | 10/1958 | Goodwin et al. | 260/42 |
| 3,419,593 | 12/1968 | Willing et al. | 260/448.2 |
| 3,445,420 | 5/1969 | Kookostseds et al. | 260/37 |
| 3,627,851 | 12/1971 | Brady et al. | 260/825 |
| 3,772,247 | 11/1973 | Flannigan et al. | 260/46.5 |
| 4,154,714 | 5/1979 | Hockemeyer et al. | 260/31.2 R |
| 4,340,709 | 7/1982 | Jaram et al. | 528/15 |
| 4,465,818 | 8/1984 | Shirahata et al. | 528/12 |
| 4,472,563 | 9/1984 | Chandra et al. | 528/15 |
| 4,559,396 | 12/1985 | Sasaki et al. | 528/15 |
| 4,562,096 | 12/1985 | Lo et al. | 427/208.8 |
| 4,599,374 | 7/1986 | Bluestein | 525/478 |
| 4,677,161 | 6/1987 | Suzuki et al. | 524/862 |
| 4,707,531 | 11/1987 | Shirahata et al. | 528/12 |
| 4,774,111 | 9/1988 | Lo et al. | 427/387 |
| 4,855,381 | 8/1989 | Mutoh et al. | 528/23 |
| 5,036,117 | 7/1991 | Chung et al. | 522/172 |
| 5,288,830 | 2/1994 | Itou et al. | 525/478 |
| 5,391,673 | 2/1995 | Ekeland et al. | 528/12 |
| 5,468,816 | 11/1995 | Huford et al. | 525/479 |
| 5,468,828 | 11/1995 | Huford et al. | 528/15 |
| 5,486,578 | 1/1996 | Carpenter, II et al. | 525/478 |

FOREIGN PATENT DOCUMENTS

| | | | |
|---|---|---|---|
| 0 604 664 A2 | 8/1993 | Belgium | C08L 83/07 |
| 0 601 938 A1 | 12/1992 | France | C08L 83/04 |
| 0 523 660 A1 | 7/1992 | Germany | C08G 77/50 |

*Primary Examiner*—Melvyn I. Marquis
*Attorney, Agent, or Firm*—Timothy J. Troy

[57] ABSTRACT

The present invention relates to a curable silicone release coating composition comprising (A) an organopolysiloxane having at least two alkenyl groups per molecule, (B) an organohydrogensiloxane having at least two silicon-bonded hydrogen atoms per molecule, (C) a siloxane resin having silicon-bonded hydrogen groups, (D) a platinum group metal-containing catalyst, and optionally (E) an inhibitor. The compositions of this invention are useful as release coatings for pressure sensitive adhesives.

27 Claims, No Drawings

SILICONE RELEASE COATING COMPOSITIONS

BACKGROUND OF THE INVENTION

The present invention relates to curable silicone release coating compositions. More specifically, the present invention relates to release modifiers for curable silicone release coatings. The present invention further relates to curable silicone release coating compositions containing a siloxane resin release modifier containing silicon-bonded hydrogen groups.

Silicone release coatings which are coated and cured onto various substrates often have very low release forces. It is not always desirable to have the release force low since in many applications it is important to maintain a certain amount of adhesive behavior or provide several release liners with differing release forces. It is known to incorporated additives into silicone-based release coatings which cause an increase in release force required to peel off an adhesive label. Such additives are called controlled-release additives or "CRA's", and in some cases "high-release additives or "HRA's". These types of additives have also been described as "release modifiers" or RMs.

Materials which are often used as CRA's include silicone resins comprising monovalent (M) siloxane groups ($R_3SiO_{1/2}$ groups wherein R is a monovalent hydrocarbon group) and tetravalent (Q) siloxane groups ($SiO_{4/2}$ groups) only, otherwise known as MQ resins.

Siloxane resins bearing silicon-bonded hydrogen groups and compositions containing them have been described in the art. For example, Brady, in U.S. Pat. No. 3,627,851 teaches a mixture of a polydiorganosiloxane gum having vinyl radicals and/or hydroxyl radicals, a benzene soluble copolymer having dimethylhydrogensiloxy units, trimethylsiloxy units and SiO2 units and a platinum catalyst cured to a clear flexible coating.

Flannigan in U.S. Pat. No. 3,772,247 discloses organopolysiloxane resins which consist of the units $R_3SiO_{1/2}$ and $SiO_2$ with units of the type RHSiO and/or $HSiO_{3/2}$ where R is a monovalent hydrocarbon group, and the ratio of $R_3SiO_{1/2}$ and RHSiO and/or $HSiO_{3/2}$ units to $SiO_2$ units being from 0.6/1 to 1.5/1 and the ratio of $R_3SiO_{1/2}$ to RHSiO and/or $HSiO_{3/2}$ units being from 1/1 to 50/1.

Jeram et al., in U.S. Pat. No. 4,340,709, discloses an addition curing silicone composition with a low viscosity in the uncured state and high physical strength in the cured state comprising a vinyl-containing diorganopolysiloxane polymer, a platinum catalyst, a hydride crosslinking agent, and a linear hydride coupler in which the viscosity of the linear hydride coupler varies from 1 to 500 centipoise at 25° C.

Suzuki in U.S. Pat. No. 4,677,161 teaches self-adhering polyorganosiloxane compositions that cure by a platinum catalyzed hydrosilation reaction and the compositions include as the adhesion promoter a polysiloxane comprising diorganohydrogensiloxy, diorganoalkoxysiloxy, and $SiO_{4/2}$ units.

Shirahata in U.S. Pat. No. 4,707,531 discloses a method for producing an MQ resin by dropwise addition of an alkyl silicate (alkyl orthosilicate or a partial hydrolysis condensate of alkyl orthosilicate) into a mixture of aqueous hydrochloric acid which contains at least 5% hydrogen chloride and a trialkylsilane or a disiloxane or a mixture thereof, at a temperature of from 0° to 90° C. with stirring. Shirahata further teaches that polydispersity and molecular weight can be controlled by the ratios of M and Q added during hydrolysis.

Mutoh in U.S. Pat. No. 4,855,381 discloses a method of making MQ resins by reacting an alkyl orthosilicate or a partial hydrolysis product thereof with an oligomeric organopolysiloxane in the presence of a catalyst. The catalyst is disclosed as being an acid such as a sulfonic acid compound or a phosphonitrile compound, an ion exchange resin acid catalyst, or a Lewis acid equilibration catalyst.

European Patent Publication 0523660 teaches a curable composition which comprises alkenyl siloxane copolymers, organopolysiloxanes having silicon-bonded hydrogen atoms, and a suitable catalyst, wherein the alkenyl siloxane copolymers have (a) units of the formula $R_aSi(OR^1)_b O_{4-(a+b)/2}$ wherein R is a $C_{1-18}$ hydrocarbon, $R^1$ is a $C_{1-4}$ alkyl group, a and b is 0, 1, 2, or 3, and a+b is no more than 3, (b) at least one unit of the formula $AR_cSiO_{4-(c+1)/2}$ wherein A is a group $-CH_2CHR^3R^2(CR^3=CH_2)_{x-1}$ wherein $R^2$ is a di-, tri-, or tetra-valent $C_{1-25}$ hydrocarbon group, $R^3$ is H or a $C_{1-6}$ alkyl group and x is 2, 3, or 4, and (c) on average at least one of certain units which have a silcarbane linkage. In addition, controlled release agents such as MQ resins, vinyl functional MQ resins, or MQ resins containing silicon-bonded hydrogen groups are disclosed.

European Patent Publication No. 0601938 discloses an adhesive modulator system based on an organopolysiloxane resin containing at least 0.1 mole percent alkenyl or alkenyl oxyalkylene groups bonded directly to silicon, an organopolysiloxane resin containing at least 0.5 mole percent hydrogen atoms bonded directly to silicon, with the two resins being in the form of a solid in the dry state and being a solvent or diluent of the two resins, and also discloses the use of the modulator system for preparing non-stick, curable compositions which include a linear polydiorganosiloxane, the modulator system, a hydrosilylation inhibitor, a linear polyorganohydrogensiloxane, and a hydrosilylation catalyst.

European Patent Publication No. 0640664 discloses an emulsion composition comprising an alkenylated silicone resin, an alkenyl polydiorganosiloxane, a silicone resin bearing SiH groups, and water, and further discloses that this composition can further comprise a precious metal catalyst to provide an emulsion release coating composition.

More recently other types of release modifiers (RMs) have been disclosed. For example, Hurford et al., in U.S. Pat. No. 5,468,816, discloses a release modifier comprising (i) an MQ resin consisting essentially of units of the formulae $SiO_2$ and $R_3SiO_{1/2}$ wherein R denotes a monovalent hydrocarbon group having up to 3 carbon atoms, a hydrogen atom, a $C_{2-5}$ alkenyl group of the formula $-R'CH=CH_2$, provided there is at least one group $-R'CH=CH_2$ present per MQ molecule and (ii) an α,ω-diolefin having the general formula $CH_2=CH-(CH_2)_n-CH=CH_2$, wherein n denotes an integer with a value of from 4 to 18. The release modifier is disclosed as giving improved release force over prior art controlled release additives. Also disclosed are solventless release compositions based on siloxanes having SiH groups and a catalyst in addition to the release modifier.

Hurford et al, in U.S. Pat. No. 5,468,828, describes a release modifier for silicone release compositions which comprises an MQ resin consisting essentially of units of the formulae $SiO_2$ (Q) and $R_3SiO_{1/2}$ (M) wherein R denotes a monovalent hydrocarbon group having up to 3 carbon atoms, a hydrogen atom, an alkenyl group of the formula $-R'CH=CH_2$ or an oxyalkenyl group of the formula $-OR'CH=CH_2$, wherein R' denotes an alkylene group of from 4 to 12 carbon atoms, provided there is at least one group $-R'CH=CH_2$ or one group $-OR'CH=CH_2$ present per MQ molecule and that no more than 50% of all M units have such groups. Also disclosed are solventless release compositions based on siloxanes having SiH groups and a catalyst in addition to the release modifier.

Carpenter II et al., in U.S. Pat. No. 5,486,578, discloses curable silicone compositions comprising an olefinic organopolysiloxane, an organohydrogensiloxane, a platinum catalyst, and silicone resins prepared by a continuous method whereby the ratio of reactants is kept constant.

These siloxane resins do not, however, provide industry with solutions to all of their requirements. There is a continuing need for improved CRAs which will give increased release forces. There is a particular need to find CRAs which will provide an increase in release force during high speed delamination.

SUMMARY OF THE INVENTION

The present invention relates to a curable silicone release coating composition comprising an alkenyl functional organopolysiloxane, an organohydrogensilicon compound, a platinum group metal-containing catalyst, a siloxane resin having silicon-bonded hydrogen groups, and optionally an inhibitor.

The present invention further relates to a curable silicone release coating composition obtained by a method comprising mixing an alkenyl functional organopolysiloxane, an organohydrogensilicon compound, a platinum group metal-containing catalyst, a siloxane resin having silicon-bonded hydrogen groups, and optionally an inhibitor.

It is an object of this invention to produce an efficient controlled release additive for use in curable silicone release coating compositions.

It is another object of this invention to utilize a siloxane resin having silicon-bonded hydrogen groups as the controlled release additive in curable silicone release coating compositions.

It is a further object of this invention to produce a controlled release additive which has good efficiency over a wide range of concentrations.

DETAILED DESCRIPTION OF THE INVENTION

The present invention relates to a curable silicone release coating composition comprising (A) an organopolysiloxane containing at least two alkenyl groups per molecule, (B) a linear organohydrogenpolysiloxane having at least two silicon-bonded hydrogen atoms per molecule, (C) a siloxane resin having the formula $(R_3SiO_{1/2})_a(HR_2SiO_{1/2})_b(SiO_{4/2})_c$ wherein R is a monovalent hydrocarbon group having from 1 to 10 carbon atoms, a has a value of 1 to 25, b has a value of 2 to 10, and c has a value of 1 to 50, and having a molar ratio of M units to Q units of from 0.6/1 to 4/1, and (D) a platinum group metal-containing catalyst.

The alkenyl groups of component (A) include groups such as vinyl, allyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl.

Preferably component (A) is an organopolysiloxane having its formula selected from the group consisting of $R^2{}_3SiO(R^1{}_2SiO)_x(R^1R^2SiO)_ySiR^2{}_3$, $R^2{}_3SiO(R^1{}_2SiO)_xSiR^2{}_3$, and $R^2{}_3SiO(R^1R^2SiO)_ySiR^2{}_3$ wherein $R^1$ is independently selected from monovalent hydrocarbon or halohydrocarbon radicals free of aliphatic unsaturation and having from 1 to 10 carbon atoms, $R^2$ is independently selected from the group consisting of $R^1$ and an alkenyl group, x has a value of from greater than zero to 7000, and y has a value of from greater than zero to 350 with the proviso that there are at least two alkenyl groups per molecule.

The monovalent radicals of $R^1$ can contain up to 10 carbon atoms and include hydrocarbon or halohydrocarbon radicals free of aliphatic unsaturation. Monovalent hydrocarbon radicals free of aliphatic unsaturation include alkyl radicals such as methyl, ethyl, propyl, butyl, hexyl, octyl, and decyl, cycloaliphatic radicals such as cyclohexyl, aryl radicals such as phenyl, tolyl, and xylyl, and aralkyl radicals such as benzyl and phenylethyl. Highly preferred monovalent hydrocarbon radicals for $R^1$ are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. The several $R^1$ radicals can be identical or different, as desired, and preferably at least 50 percent of all $R^1$ radicals are methyl.

The alkenyl group of $R^1$ is preferably a group having the formula $-(CH_2)_dCH=CH_2$ or $-(CH_2)_eCH=CH-(CH_2)_fCH=CH_2$ wherein d has a value of 0 to 20, e has the value of 0 to 9, and f has the value of 3, 4, or 5. The disclosure of U.S. Pat. No. 4,609,574, incorporated herein by reference, shows highly-preferred higher alkenyl functional organopolysiloxanes.

It is highly preferred that component (A) is an organopolysiloxane having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350. Preferably x has a value of from 10 to 200, and y has a value of from 1 to 10.

The value of the subscripts x and y above are such that the organopolysiloxane of Component (A) preferably has a viscosity at 25° C. of at least 40 millipascal-seconds (mPa.s) (1 mPa.s=1 centipoise (cP)). Component (A) can have an ultrahigh viscosity similar to a state of raw rubber. If the viscosity is less than 40 mPa.s, the composition may be difficult to coat onto a substrate. If the compositions of the present invention are solventless, the viscosity at 25° C. of the component is preferably 40–10,000 mPa.s, and especially 40–5000 mPa.s. If the compositions are in the form of a solution, the viscosity can range from 100,000 mPa.s to the viscosity of a raw rubber composition, however, it is preferred that if the composition is in the form of a solution that component (A) have a viscosity of 500,000 mPa.s or more.

The alkenyl functional organopolysiloxanes of Component (A) are well known in the art, many of these being available commercially, and further description thereof is considered unnecessary.

Component (B) is a linear organohydrogenpolysiloxane having at least two silicon-bonded hydrogen groups per molecule. Component (B) is exemplified by bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxane-dimethylsiloxane copolymers. The disclosure of U.S. Pat. No. 4,154,714, incorporated herein by reference, shows preferred organohydrogenpolysiloxanes. The viscosity at 25° C. of (B) is preferably 1 to 1,000 mPa.s, and it is highly preferred that the viscosity of component (B) is from 5 to 500 mPa.s.

It is particularly preferred that component (B) is a compound having its formula selected from the group consisting of $HMe_2SiO(Me_2SiO)_g(MeHSiO)_hSiMe_2H$, $HMe_2SiO(Me_2SiO)_gSiMe_2H$, $Me_3SiO(Me_2SiO)_g(MeHSiO)_hSiMe_3$, $HMe_2SiO(MeHSiO)_hSiMe_2H$, and $Me_3SiO(MeHSiO)_hSiMe_3$ wherein Me denotes methyl wherein g has a value of from greater than zero to 1000 and h has a value of from greater than zero to 200.

The organohydrogensiloxanes of Component (B) are well known in the art, many of these being available commercially, and further description thereof is considered unnecessary. 10 Component (C) is a siloxane resin having the formula $(R_3SiO_{1/2})_a(HR_2SiO_{1/2})_b(SiO_{4/2})_c$ wherein R is a monovalent hydrocarbon group having from 1 to 10 carbon atoms, a has a value of 1 to 25, b has a value of 2 to 10, c has a value of 1 to 50, and having a molar ratio of M units to Q units of from 0.6/1 to 4/1, and preferably from 1/1 to 3/1, and most preferably from 1/1 to 2/1. The monovalent hydrocarbon groups of R are as defined above including preferred embodiments thereof. It is preferred that R be methyl. It is preferred that a have a value of 6 to 14, b have a value from 3 to 5, and c have a value of 4 to 15. It is especially preferred that b is 3.

These types of siloxane resins can be prepared, for example, by dropwise addition of an alkyl silicate (alkyl orthosilicate or a partial hydrolysis condensate of alkyl orthosilicate) into a mixture of aqueous hydrochloric acid which contains at least 5% hydrogen chloride and a trialkylsilane or a disiloxane or a mixture thereof, at a temperature of from 0° to 90° C. with stirring such as is described by Shirahata in U.S. Pat. No. 4,707,531 or by a continuous process wherein a constant ratio of reactants is maintained during the process such as is described by Ekeland et al. in U.S. Pat. No. 5,391,673, both patents being incorporated herein by reference to teach how to make these types of siloxane resins.

The SiH equivalent ratio of Component (B) to Component (C) can be from 1/99 to 99/1, and is preferably from 10/90 to 90/10.

The amount of Component (B)+(C) that is used in the compositions of this invention is not narrowly limited. The amounts, expressed in terms of the ratio of the number of silicon-bonded hydrogen atoms of Component (B)+(C) to the number of silicon-bonded alkenyl groups of Component (A), should be sufficient to provide a ratio of at least 1/100 to 100/1, preferably from 1/2 to 20/1, and most preferably from 1/2 to 2/1.

It is preferred that from 0.5 to 90 parts by weight of Component (B)+(C) be used, and it is highly preferred that from 2 to 20 parts by weight of Component (B)+(C) be employed per 100 parts by weight of Component (A).

Component (D) is a platinum group metal-containing catalyst component which facilitates the reaction of silicon-bonded hydrogen atoms with silicon-bonded alkenyl radicals. By platinum group it is meant herein ruthenium, rhodium, palladium, osmium, iridium and platinum.

The platinum group metal-containing catalyst is preferably a platinum containing catalyst component since they are the most widely used and available and because they provide a more favorable effect for the compositions of this invention in terms of controlled release force. Platinum-containing catalysts can be a compound or complex of a platinum group metal. Preferred platinum-containing catalysts include chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, and platinum black.

A particularly preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. Another particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

The platinum catalysts are well known in the art, many of these being available commercially, and further description thereof is considered unnecessary.

The amount of platinum group metal-containing catalyst component that is used is not narrowly limited as long as there is a sufficient amount to accelerate a room temperature reaction between an organohydrogensiloxane and an alkenyl organopolysiloxane and not so much as to make its action uncontrollable by the use of an inhibitor. The exact necessary amount of this catalyst component will depend on the particular catalyst utilized and is not easily predictable. However, for platinum-containing catalysts the amount can be as low as one part by weight of platinum for every one million parts by weight of Component (A). However, preferably the catalyst is added at an amount of 10 to 10,000 parts for every one million parts of (A), and it is highly preferred that the amount is at 50 to 250 parts by weight of platinum for every one million parts by weight of (A).

The compositions of this invention can optionally comprise (E) an inhibitor. The inhibitor can be any material that is known to be, or can be, used to inhibit the catalytic activity of platinum group metal-containing catalysts. By the term "inhibitor" it is meant herein a material that retards the room temperature curing of a curable mixture of Components (A), (B), (C), and (D) when incorporated therein in small amounts, such as less than 10 parts by weight of the composition, without preventing the elevated curing of the mixture. Examples suitable inhibitors include ethylenically or aromatically unsaturated amides, acetylenic compounds including acetylenic alcohols and silylated acetylenic alcohols, ethylenically unsaturated isocyanates, olefinic siloxanes, unsaturated hydrocarbon diesters, conjugated ene-ynes, cyclic siloxanes, hydroperoxides, nitriles, and diaziridines.

Preferred inhibitors include acetylenic alcohols such as those disclosed in U.S. Pat. No. 3,445,420, including ethynylcyclohexanol and methylbutynol, unsaturated carboxylic esters such as diallyl maleate and dimethyl maleate, maleates and fumarates such as those disclosed in U.S. Pat. Nos. 4,562,096 and 4,774,111, including diethyl fumarate, diallyl fumarate, and bis-(methoxyisopropyl) maleate, conjugated ene-ynes such as those disclosed in U.S. Pat. Nos. 4,465, 818, 4,472,563, and 4,559,396, and cyclic siloxanes such as methylvinyltetracyclosiloxane and methylvinylpentacyclosiloxane. The above-mentioned patents are incorporated herein by reference to teach how to prepare compounds which are suitable for use as an inhibitor in the compositions of this invention. Maleates, fumarates, acetylenic alcohols, silylated acetylenic alcohols, conjugated ene-ynes, and cyclic siloxanes are the preferred inhibitors for the compositions of this invention.

The amount of inhibitor to be used in the release coating compositions of this invention is not critical. It is preferred that from 0.1 to 10 parts by weight of inhibitor be used per 100 parts by weight of component (A).

The release coating compositions of this invention can further comprise a siloxane resin consisting essentially of at least one $R^3_3SiO_{1/2}$ (M) unit and at least one $SiO_{4/2}$ (Q) unit wherein $R^3$ is independently selected from the group consisting of a monovalent hydrocarbon group having from 1 to 10 carbon atoms and an alkenyl group having from 2 to 10 carbon atoms. The siloxane resins have a molar ratio of M units to Q units of from 0.6/1 to 4/1. It is preferred that the siloxane resins of the invention have a molar ratio of M to Q units of 0.6/1 to 1.9/1, more preferably from 1.2/1 to 1.6/1, and most preferably 1.4/1.

The group $R^3$ can be a monovalent hydrocarbon group having from 1 to 10 carbon atoms or an alkenyl group having from 2 to 10 carbon atoms as described above. Highly preferred monovalent hydrocarbon groups for $R^3$ are methyl or phenyl, and a highly preferred alkenyl group is vinyl.

Siloxane resins useful in the release coating compositions are exemplified by siloxane resins consisting essentially of: $Me_3SiO_{1/2}$ (M) and $SiO_{4/2}$ (Q) units, consisting essentially of: $Me_2ViSiO_{1/2}$ (M) and $SiO_{4/2}$ (Q) units, and consisting essentially of: $Me_3SiO_{1/2}$ (M), $Me_2ViSiO_{1/2}$ (M), and $SiO_{4/2}$ (Q) units, wherein Me denotes methyl, Vi denotes vinyl, and the molar ratio of M to Q units is from 0.6/1 to 1.9/1.

The siloxane resin can be prepared by well known methods. It is preferably prepared by the silica hydrosol capping process of U.S. Pat. No. 2,676,182 to Daudt et al., as modified by U.S. Pat. No. 3,627,851 to Brady, and U.S. Pat. No. 3,772,247 to Flannigan, each patent being incorporated herein by reference to teach how to prepare siloxane resins which are useful in the instant invention. Further, the siloxane resins can be prepared by the cohydrolysis of a trialkyl hydrolyzable silane and alkyl silicate as described in U.S. Pat. No. 2,857,356, to Goodwin herein incorporated by reference for its teaching of how to prepare the resin.

It is preferred that from 1 to 150 parts by weight of siloxane resin be used, and it is highly preferred that from 5 to 80 parts by weight of siloxane resin be employed per 100 parts by weight of Component (A).

The release coatings of this invention can additionally comprise a bath life extender compound in a total amount sufficient to further retard the curing reaction at room temperature such as those described in Chung et al., U.S. Pat. No. 5,036,117 incorporated herein by reference. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender to be used in the compositions of this invention is not critical and is merely that amount that will provide a longer bath life for the composition than the bath life of an identical composition that does not contain the extender. The amount of Component bath life extender that is to be used can be as high as 10 parts by weight per 100 parts of Component (A). Preferably, the amount of bath life extender to be used in the compositions of this invention falls within the range of 0.1 to 5 parts by weight, and most preferably 1 to 3 parts by weight per 100 parts of component (A).

The release coatings of the present invention can further comprise a diluent. Examples of suitable diluents include aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more diluents may be used together.

The amount of diluent is not critical and may be readily determined by one skilled in the art. The compositions of this invention may contain up to 10,000 parts by weight of diluent, however it is preferred that from about 500 to 2,000 parts by weight be employed per 100 parts by weight of component (A).

The release coatings of this invention can be prepared by homogeneously mixing Components (A), (B), (C), (D), optionally (E), and any other optional components in any order, using any suitable mixing means, such as a spatula, a drum roller, a mechanical stirrer, a three-roll mill, a sigma blade mixer, a bread dough mixer, and a two-roll mill. For storage stability purposes it is preferred to keep components (A) and (C) separate from component (B). This could be achieved for example by mixing components (A), (C), and part of component (D) as a first mixture, and mixing components (B) and optionally (E) with the rest of component (D) as a second mixture. Alternatively, each of the components may be stored and supplied separately. In yet another option, component (A) and optionally (E) are supplied as a first part, component (B) as a second part, and a mixture of components (C) and (D) as a third part. Each part could include some of Component (D) and any other optional ingredients. Immediately prior to using the composition for application to substrates the different parts and/or mixtures could be admixed in the required ratios, for example 1/1, 10/1, or even 100/1.

The release coatings of this invention can also contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, alpha-olefins, and adhesive-release modifiers other than those described above.

The compositions of this invention have utility as formable compositions to provide organosilicon articles such as O-rings, tubing, wire-coating, gaskets, encapsulant and sealant compositions, and as coating compositions. The compositions of the present invention have particular utility as release coatings.

In another aspect the present invention relates to a coated substrate obtained by a method comprising the steps of: (I) applying a curable silicone coating composition on the surface of a substrate wherein the composition comprises the curable silicone release coating composition of this invention delineated hereinabove, and (II) exposing the coating and substrate to an energy source selected from the group consisting of (i) heat and (ii) actinic radiation in an amount sufficient to cure the coating. The coated substrate of this invention can further be prepared by (III) applying an adhesive on the coating after step (II). The curable silicone coating composition is the composition as delineated above and any optional ingredients which are all delineated above, including amounts and preferred embodiments thereof.

By actinic radiation it is meant ultraviolet light; electron beam radiation; and alpha-, beta-, gamma- and x- rays. By heat it is meant infrared radiation, hot-air, microwave radiation, etc. Of course actinic radiation is frequently accompanied by heat and the use of a combination of the two falls within the scope and spirit of the present method. In the preferred method of this invention, the coating step can be accomplished by any suitable manner known in the art, such as by spreading, brushing, extruding, spraying, gravure, kiss-roll and air-knife.

In a preferred embodiment of the instant method the solid substrate is a flexible sheet material such as paper, polyolefin film and polyolefin-coated paper or foil. Other suitable solid substrates that can be coated by the method of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the liquid curable composition has been coated onto a substrate it is heated and/or irradiated with actinic radiation, as noted herein, to cure the liquid coating and to adhere it to the substrate.

In a preferred embodiment of the method of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The method of this invention is also applicable to adhesive materials, other than pressure sensitive adhesives. Examples of said adhesive materials include foods, asphalt and gum polymers.

The following examples are disclosed to further teach, but not limit, the invention which is properly delineated by the appended claims. All amounts (parts and percentages) are by weight unless otherwise indicated. Viscosities were measured with a rotating spindle viscometer (1 centistoke (cS)=1 mm$^2$/s). In the examples hereinbelow Me denotes methyl, Vi denotes vinyl, and Hex denotes 5-hexenyl.

The following materials were employed in preparing the compositions in the examples:

Organopolysiloxane A was a compound having the general formula $HexMe_2SiO(Me_2SiO)_a SiMe_2Hex$ having a Dp of about 30.

Organopolysiloxane B was a compound having the formula $HexMe_2SiO(Me_2SiO)_x(MeHexSiO)_y SiMe_2Hex$ having 2 mole percent hexenyl groups, and having a Dp of 150.

Organohydrogensiloxane A was a trimethylsiloxy-endblocked-polydimethylsiloxane-methylhydrogensiloxane copolymer having a total average Dp of about 40 and about 70 mole % methylhydrogen moiety on the siloxane chain.

Catalyst A was a platinum catalyst (a soluble platinum complex containing about 0.50% platinum formed from chloroplatinic acid and divinyltetramethyldisiloxane).

Inhibitor A was bis(2-methoxy-1-methylethyl) maleate.

Siloxane resin A was a benzene soluble siloxane resin copolymer consisting essentially of $Me_3SiO_{1/2}$ (M), $Me_2ViSiO_{1/2}$ (M), and $SiO_2$ units wherein Me denotes methyl, Vi denotes vinyl, the molar ratio of M units to Q units is about 0.7/1, and wherein the siloxane resin copolymer contains from 1.75 to 2.3 weight percent of vinyl.

Siloxane resin B was a compound having the formula $(Me_3SiO_{1/2})_a(HMe_2SiO_{1/2})_b(SiO_{4/2})_c$ wherein Me denotes methyl, having an M to Q molar ratio of 2/1, having 3 silicon-bonded hydrogen atoms per molecule, having a viscosity of 35 centipoise (cP) (1 centipoise=1 millipascal-second (mPa.s)), having 0.3 weight percent of SiH, a has a value of about 5, b has a value of about 3, and c has a value of about 4.

Example 1

A release modifier was prepared by mixing 50 parts of Siloxane Resin A with 50 parts of Organopolysiloxane A. The release modifier was denoted RM 1 (Release Modifier 1).

A coating was prepared by adding to a 4 ounce jar about 97.3 parts of Organopolysiloxane B, about 1.9 parts of Catalyst A, and about 0.8 parts of Inhibitor A, and then stirring this mixture and this was denoted Coating A. A release coating composition was then prepared by mixing an amount of Coating A, an amount of RM 1, an amount of Siloxane Resin B (SRB), and an amount of Organohydrogensiloxane A (OHSA) on a rotary mixer for 10 minutes. The SiH equivalent ratio of SRB to OHSA is also shown in Table 1 below. These components were mixed in the amounts (grams) denoted in Table 1 below. Thus nine silicone release coating compositions were prepared (denoted REL 1-REL 9 in Table 1).

The nine resulting silicone release coating compositions were then coated onto S2S kraft paper by using a hand roll blade coaxer at around 0.7 lb/ream thickness. The coated papers were cured in the forced air oven of a pilot coater at 300° C. for 15 seconds. A plastic film coated with a commercially available precast hotmelt pressure sensitive adhesive was relaminated over the newly prepared release coating surface by using a 5 lb. hard rubber coated roller. The coating was aged for 1 day at room temperature before the lamination. The laminates were also aged for 1 additional day at room temperature under pressure. The laminates were cut into strips having about 1 inch width for a release force measurement. The release test was carried out at 5 delaminating speeds, 0.3 meters per min.(m/min), 1 m/min., 10 m/min., 100 m/min., and 300 m/min., respectively, using an Imass(R) high speed peel tester. The average of four measurements of the release force at each speed was taken and the resulting average value is denoted in Table 2 below for each sample. The release force is reported in grams/inch in Table 2.

TABLE 1

| Release Coating | Coating A (grams) | SRB/OHSA SiH equivalent ratio | RM1 (grams) | SRB (grams) | OHSA (grams) |
|---|---|---|---|---|---|
| REL 1 | 6 | 0/100 | 4 | 0.00 | 0.59 |
| REL 2 | 4 | 0/100 | 6 | 0.00 | 0.64 |
| REL 3 | 2 | 0/100 | 8 | 0.00 | 0.70 |
| REL 4 | 6 | 50/50 | 4 | 0.79 | 0.29 |
| REL 5 | 4 | 50/50 | 6 | 1.10 | 0.32 |
| REL 6 | 2 | 50/50 | 8 | 1.19 | 0.35 |
| REL 7 | 6 | 90/10 | 4 | 1.80 | 0.06 |
| REL 8 | 4 | 90/10 | 6 | 1.97 | 0.06 |
| REL 9 | 2 | 90/10 | 8 | 2.14 | 0.07 |

TABLE 2

| Release Coating | Release Force (grams/inch) | | | | |
|---|---|---|---|---|---|
| | 0.3 | 1 | 10 | 100 | 300 |
| REL 1 | 15.8 | 17.0 | 20.7 | 47.1 | 59.5 |
| REL 2 | 40.9 | 30.2 | 46.9 | 100.9 | 95.3 |
| REL 3 | 319.1 | 162.3 | 113.6 | 140.7 | 145.5 |
| REL 4 | 11.8 | 13.9 | 31.3 | 70.7 | 94.5 |
| REL 5 | 32.5 | 26.7 | 58.2 | 139.9 | 137.7 |
| REL 6 | 249.9 | 179.9 | 161.9 | 224.4 | 209.9 |
| REL 7 | 10.8 | 14.5 | 40.9 | 101.6 | 156.6 |
| REL 8 | 17.4 | 29.2 | 76.6 | 174.6 | 213.0 |
| REL 9 | 94.8 | 130.7 | 148.8 | 318.8 | 366.5 |

That which is claimed is:

1. A curable silicone release coating composition comprising:
   (A) an organopolysiloxane having at least two alkenyl groups per molecule;
   (B) a linear organohydrogenpolysiloxane having at least two silicon-bonded hydrogen atoms per molecule;
   (C) a siloxane resin having the formula $(R_3SiO_{1/2})_a(HR_2SiO_{1/2})_b(SiO_{4/2})_c$ wherein R is a monovalent hydrocarbon group having from 1 to 10 carbon atoms, a has a value of 1 to 25, b has a value of 2 to 10, c has a value of 1 to 50, and having a molar ratio of M units to Q units of from 0.6/1 to 4/1 wherein M denotes the monovalent $(R_3SiO_{1/2})_2$ units and the monovalent $(HR_2SiO_{1/2})_b$ units and Q denotes the tetravalent $(SiO_{4/2})_c$ units; and
   (D) a platinum group metal-containing catalyst.

2. A composition according to claim 1, wherein (A) is an organopolysiloxane having its formula selected from the group consisting of $ViMe_2SiO(Me_2SiO)_x(MeViSiO)_ySiMe_2Vi$, $Me_3SiO$ $(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO$ $(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO$ $(MeHexSiO)_ySiMe_3$, $HexMe_2SiO(Me_2SiO)_x(MeHexSiO)_y$ $SiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350.

3. A composition according to claim 1, wherein (B) is a compound having its formula selected from the group consisting of $HMe_2SiO(Me_2SiO)_f(MeHSiO)_gSiMe_2H$, $HMe_2SiO(Me_2SiO)_fSiMe_2H$, $Me_3SiO(Me_2SiO)_f(MeHSiO)_g$ $SiMe_3$, $HMe_2SiO(MeHSiO)_gSiMe_2H$, and $Me_3SiO$ $(MeHSiO)_gSiMe_3$ wherein Me denotes methyl wherein f has a value of from greater than zero to 1000 and g has a value of from greater than zero to 200.

4. A composition according to claim 1, wherein b has a value of 3 to 5.

5. A composition according to claim 1, wherein (C) has a molar ratio of M units to Q units of from 1/1 to 2/1.

6. A composition according to claim 1, wherein (D) is selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, and platinum black.

7. A composition according to claim 1, wherein the composition further comprises (E) an inhibitor.

8. A composition according to claim 7, wherein (E) is selected from the group consisting of maleates, fumarates, acetylenic alcohols, silylated acetylenic alcohols, conjugated ene-ynes, and cyclic siloxanes.

9. A composition according to claim 1, wherein the composition further comprises at least one ingredient selected from the group consisting of a siloxane resin consisting essentially of at least one $R^3_3SiO_{1/2}$ (M) unit and at least one $SiO_{4/2}$ (Q) unit wherein $R^3$ is independently selected from the group consisting of a monovalent hydrocarbon group having from 1 to 10 carbon atoms and an alkenyl group having from 2 to 10 carbon atoms, and having a molar ratio of M units to Q units ranges from 0.4/1 to 4/1, a bath life extender, and a diluent.

10. A composition according to claim 9, wherein the siloxane resin is selected from the group consisting of a siloxane resin consisting essentially of: $Me_3SiO_{1/2}$ (M) and $SiO_{4/2}$ (Q) units, a siloxane resin consisting essentially of: $Me_2ViSiO_{1/2}$ (M) and $SiO_{4/2}$ (Q) units, and a siloxane resin consisting essentially of: $Me_3SiO_{1/2}$ (M), $Me_2ViSiO_{1/2}$ (M), and $SiO_{4/2}$ (Q) units, wherein Me denotes methyl, Vi denotes vinyl, and the molar ratio of M to Q units is from 0.6/1 to 1.9/1.

11. A composition according to claim 9, wherein the bath life extender is selected from the group consisting of compounds which contain one or more primary or secondary alcohol groups, carboxylic acids, compounds which yield carboxylic acids when exposed to water at room temperature, cyclic ethers, and water.

12. A composition according to claim 9, wherein the diluent is selected from the group consisting of pentane, hexane, heptane, octane, nonane, benzene, toluene, xylene, acetone, methylethyl ketone, and methylisobutyl ketone, trichloroethane, perchloroethylene, and bromobenzene.

13. A curable silicone release coating composition obtained by a method comprising
(I) mixing:
(A) an organopolysiloxane having at least two alkenyl groups per molecule;
(B) a linear organohydrogenpolysiloxane having at least two silicon-bonded hydrogen atoms per molecule;
(C) a siloxane resin having the formula $(R_3SiO_{1/2})_a$ $(HR_2SiO_{1/2})_b(SiO_{4/2})_c$ wherein R is a monovalent hydrocarbon group having from 1 to 10 carbon atoms, a has a value of 1 to 25, b has a value of 2 to 10, c has a value of 1 to 50, and having a molar ratio of M units to Q units of from 0.6/1 to 4/1 wherein M denotes the monovalent $(R_3SiO_{1/2})_a$ units and the monovalent $(HR_2SiO_{1/2})_b$ units and Q denotes the tetravalent $(SiO_{4/2})_c$ units; and
(D) a platinum group metal-containing catalyst.

14. A composition according to claim 13, wherein (A) is an organopolysiloxane having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than 0 to 7000, and y has a value of from greater than 0 to 350.

15. A composition according to claim 13, wherein (B) is a compound having its formula selected from the group consisting of $HMe_2SiO(Me_2SiO)_d(MeHSiO)_eSiMe_2H$, $HMe_2SiO(Me_2SiO)_dSiMe_2H$, $Me_3SiO(Me_2SiO)_d(MeHSiO)_eSiMe_3$, $HMe_2SiO(MeHSiO)_eSiMe_2H$, and $Me_3SiO(MeHSiO)_eSiMe_3$ wherein Me denotes methyl wherein d has a value of from greater than zero to 1000 and e has a value of from greater than zero to 200.

16. A composition according to claim 13, wherein b has a value of 3 to 5.

17. A composition according to claim 13, wherein (C) has a molar ratio of M units to Q units of from 1/1 to 2/1.

18. A composition according to claim 13, wherein (D) is selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, and platinum black.

19. A composition according to claim 13, wherein the method further comprises adding, during step (I), (E) an inhibitor.

20. A composition according to claim 19, wherein (E) is selected from the group consisting of maleates, fumarates, acetylenic alcohols, silylated acetylenic alcohols, conjugated ene-ynes, and cyclic siloxanes.

21. A composition according to claim 13, wherein the method further comprises adding, during step (I), at least one ingredient selected from the group consisting of a siloxane resin consisting essentially of at least one $R^3{}_3SiO_{1/2}$ (M) unit and at least one $SiO_{4/2}$ (Q) unit wherein $R^3$ is independently selected from the group consisting of hydrogen, a monovalent hydrocarbon group having from 1 to 10 carbon atoms, and an alkenyl group having from 2 to 10 carbon atoms, and having a molar ratio of M Units to Q units ranges from 0.4/1 to 4/1, a bath life extender, and a diluent.

22. A composition according to claim 21, wherein the siloxane resin is selected from the group consisting of a siloxane resin consisting essentially of: $Me_3SiO_{1/2}$ (M) and $SiO_{4/2}$ (Q) units, a siloxane resin consisting essentially of: $Me_2ViSiO_{1/2}$ (M) and $SiO_{4/2}$ (Q) units, and a siloxane resin consisting essentially of: $Me_3SiO_{1/2}$ (M), $Me_2ViSiO_{1/2}$ (M), and $SiO_{4/2}$ (Q) units, wherein Me denotes methyl, Vi denotes vinyl, and the molar ratio of M to Q units is from 0.6/1 to 1.9/1.

23. A composition according to claim 21, wherein the bath life extender is selected from the group consisting of compounds which contain one or more primary or secondary alcohol groups, carboxylic acids, compounds which yield carboxylic acids when exposed to water at room temperature, cyclic ethers, and water.

24. A composition according to claim 21, wherein the diluent is selected from the group consisting of pentane, hexane, heptane, octane, nonane, benzene, toluene, xylene, acetone, methylethyl ketone, and methylisobutyl ketone, trichloroethane, perchloroethylene, and bromobenzene.

25. A coated substrate obtained by a method comprising
(I) applying a curable silicone composition on the surface of a substrate wherein the curable silicone composition is obtained by mixing:
(A) an organopolysiloxane having at least two alkenyl groups per molecule;
(B) a linear organohydrogenpolysiloxane having at least two silicon-bonded hydrogen atoms per molecule;
(C) a siloxane resin having the formula $(R_3SiO_{1/2})_a$ $(HR_2SiO_{1/2})_b(SiO_{4/2})_c$ wherein R is a monovalent hydrocarbon group having from 1 to 10 carbon atoms, a has a value of 1 to 25, b has a value of 2 to 10, c has a value of 1 to 50, and having a molar ratio of M units to Q units of from 0.6/1 to 4/1 wherein M denotes the monovalent $(R_3SiO_{1/2})_a$ units and the monovalent $(HR_2SiO_{1/2})_b$ units and Q denotes the tetravalent $(SiO_{4/2})_c$ units; and
(D) a platinum group metal-containing catalyst.

26. A coated substrate according to claim 25, wherein the method further comprises (II) exposing the coating and the substrate to heat in an amount sufficient to cure the coating.

27. A coated article according to claim 26, wherein the method further comprises applying a pressure sensitive adhesive on the coated substrate after step (II).

* * * * *